(12) United States Patent
Tulli et al.

(10) Patent No.: US 12,349,697 B2
(45) Date of Patent: Jul. 8, 2025

(54) APPARATUS FOR MAKING A CONFECTIONERY PRODUCT

(71) Applicant: Perfetti Van Melle S.P.A., Lainate (IT)

(72) Inventors: Alessio Tulli, Origgio (IT); Evsen Suleymanoglu, Milan (IT)

(73) Assignee: Perfetti Van Melle S.P.A., Lainate (Milano) (IT)

( * ) Notice: Subject to any disclaimer, the term of this patent is extended or adjusted under 35 U.S.C. 154(b) by 0 days.

(21) Appl. No.: 18/576,459

(22) PCT Filed: Jul. 6, 2022

(86) PCT No.: PCT/IB2022/056226
§ 371 (c)(1),
(2) Date: Jan. 4, 2024

(87) PCT Pub. No.: WO2023/281403
PCT Pub. Date: Jan. 12, 2023

(65) Prior Publication Data
US 2024/0260604 A1    Aug. 8, 2024

(30) Foreign Application Priority Data

Jul. 6, 2022 (IT) .......................... 102021000018062

(51) Int. Cl.
*A23G 4/04* (2006.01)
*A23G 4/18* (2006.01)
(Continued)

(52) U.S. Cl.
CPC ................. *A23G 4/04* (2013.01); *A23G 4/18* (2013.01); *A23G 3/0023* (2013.01); *A23G 3/0247* (2013.01); *A23G 3/50* (2013.01)

(58) Field of Classification Search
CPC ...... A23G 3/0247; A23G 3/0023; A23G 4/04; A23G 4/18; A23G 3/50
See application file for complete search history.

(56) References Cited

U.S. PATENT DOCUMENTS 7,442,026 B2 * 10/2008 Shulski ................ A23G 3/0252
425/236
8,647,104 B1 * 2/2014 Tillman ................ A21C 11/106
425/294
(Continued)

FOREIGN PATENT DOCUMENTS

CN         201700349 U    1/2021
EP           1588620 B1    5/2007
(Continued)

OTHER PUBLICATIONS

International Preliminary Report on Patentability of PCT/IB2022/056226 issued Sep. 25, 2023.

(Continued)

*Primary Examiner* — Seyed Masoud Malekzadeh
(74) *Attorney, Agent, or Firm* — Silvia Salvadori, P.C.; Silvia Salvadori

(57) ABSTRACT

A description is given of an apparatus (10) for making a confectionery product (1) comprising a chewing gum having the shape of an irregular pentagon with rounded corners and sides of elliptical or semi-elliptical shape, the apparatus comprising a forming roller (11) and a contrasting element (12), wherein said forming roller (11) has a pattern obtained from the superimposition of two reciprocally orthogonal series of irregular hexagons (20), perimetrically delimited by knives, all identical one to the other, the intersection whereof determines in each hexagon four irregular pentagons (50, 50') identical one to the other in opposing pairs.

9 Claims, 2 Drawing Sheets

(51) Int. Cl.
*A23G 3/02* (2006.01)
*A23G 3/34* (2006.01)
*A23G 3/50* (2006.01)

(56) References Cited

U.S. PATENT DOCUMENTS

| | | | |
|---|---|---|---|
| 2006/0040041 A1* | 2/2006 | Shulski | A23G 3/0025 |
| | | | 426/660 |
| 2020/0069581 A1 | 3/2020 | Ghalili | |
| 2022/0287322 A1* | 9/2022 | Ng | A23G 4/04 |

FOREIGN PATENT DOCUMENTS

| | | | |
|---|---|---|---|
| KR | 20060083549 A | | 7/2006 |
| PL | 239667 B1 | * | 12/2021 |
| WO | 2010006385 A1 | | 1/2010 |

OTHER PUBLICATIONS

Search Report and Written Opinion of PCT/IB2022/056226 issued Oct. 7, 2022.

* cited by examiner

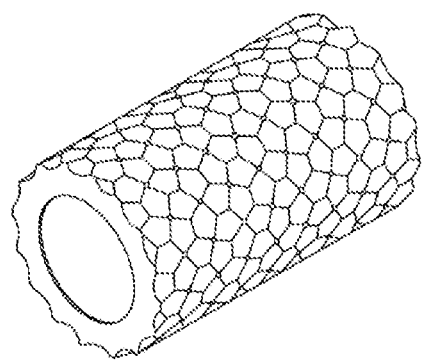
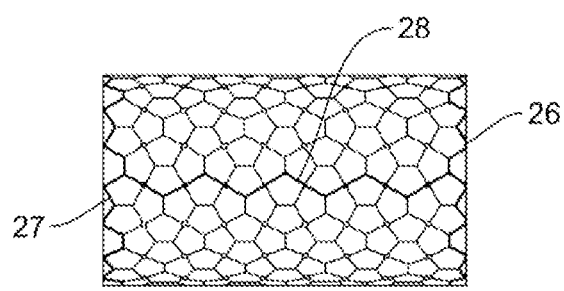
FIG. 1
FIG. 2
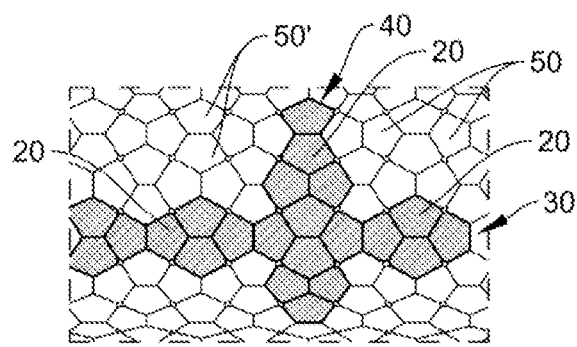
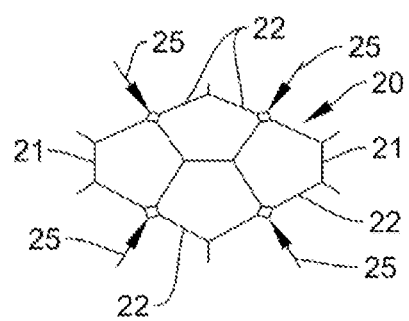
FIG. 3
FIG. 4

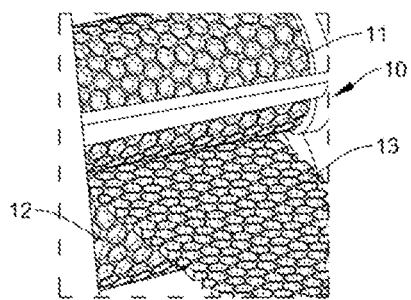
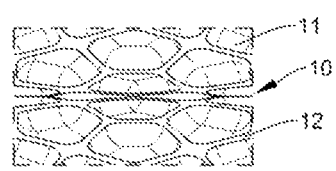
FIG. 5
FIG. 6
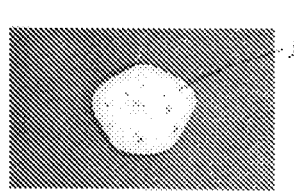
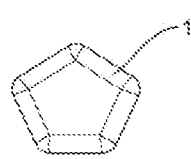
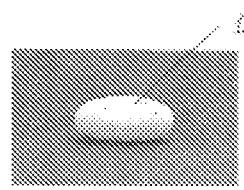
FIG. 7
FIG. 8
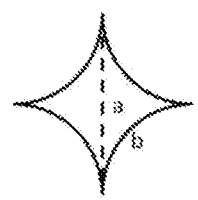
FIG. 9

APPARATUS FOR MAKING A CONFECTIONERY PRODUCT

This application is a U.S. national stage of PCT/IB2022/056226 filed on 6 Jul. 2022, which claims priority to and the benefit of Italian Patent Application No. 2021000018062 filed on 8 Jul. 2021, the contents of which are incorporated herein by reference in their entireties.

The subject of the invention is an apparatus for making a confectionery product consisting of a chewing gum having the shape of an irregular pentagon with rounded corners.

STATE OF THE ART

Production lines are known for the manufacture of chewing gum which provide for the formation of individual chewing gums through the use of pairs of superimposed, counter-rotating rollers having the function of cutting the sheet of gum mass into a series of individual mono-pieces having a certain shape.

EP1588620 discloses the continuous production of an edible mass product, in particular a confectionery mass, which takes place by forming a sheet with a desired thickness, depositing this sheet on a conveyor belt up to a cutting station in which the individual mono-pieces of product are formed.

This cutting station consists of superimposed rollers known as cutters which, depending on the inclination and positioning of the knives, make it possible to obtain mono-pieces of the shape desired on each occasion.

The solution disclosed by EP1588620 allows maximum efficiency to be obtained where the cutters are characterised by a positioning and inclination of the knives that allow regular shapes (circular, elliptical, hexagonal or undulated) to be obtained from the sheets of gum material, giving rise to a series of mono-pieces perfectly in sequence with each other.

The prior art does not describe systems enabling the creation of products having a geometric shape which, when reproduced in succession and without interruption on a sheet of chewing gum or other edible material, does not give rise, when the individual mono-pieces are formed, to the generation of waste material as, for example, in the case of a shape such as a pentagon.

SCOPE OF THE INVENTION

The Applicant has further researched the possibility of using production systems similar to that described in the prior art for making chewing gum characterised by new, even irregular shapes without thereby translating into the production of a high quantity of waste material.

It is, therefore, an object of the invention to provide an apparatus for producing edible confectionery products, in particular chewing gum, having a particular geometric shape with minimum product waste.

A further object of the invention is to provide such an apparatus that allows in-line cutting of the sheet of material to be carried out directly, trimming the side edges with minimum material waste, and transversely cutting the sheet without producing waste.

Another object again of the invention is to provide such an apparatus that is simple and inexpensive to manufacture and highly reliable in use.

The invention likewise relates to a method for producing these edible confectionery products.

The aforesaid and other objects of the apparatus according to the invention are achieved with the features that are the object of independent claim 1.

Preferred embodiments of the invention are disclosed in the dependent claims.

Substantially, the apparatus for the production of edible products, in particular chewing gum, according to the invention, comprises several pairs of opposing and counter-rotating rollers suitable for reducing the thickness of a gum base sheet to a desired height for passing between a forming roller and a contrasting element, wherein said forming roller has a first series of irregular hexagons oriented horizontally, i.e. axially, and a second series of irregular hexagons vertically oriented, i.e. in a circumferential direction with respect to said forming roller, said irregular hexagons being all identical one to the other and perimetrically delimited by knives, the intersection of said reciprocally orthogonal series of irregular hexagons determining in each hexagon four irregular pentagons identical to each other in opposing pairs.

BRIEF DESCRIPTION OF THE DRAWINGS

Further features of the invention will be made clearer by the following detailed description of a purely illustrative, and therefore non-limiting, embodiment of the invention, illustrated in the accompanying drawings, in which:

FIG. 1 is a perspective view of a suitably shaped forming roller co-operating with a contrasting element or similar counter-rotating roller of an apparatus according to the invention;

FIG. 2 is a plan view of the roller of FIG. 1, in which the knives for longitudinal and transverse cuts of the sheet of material for the production of confectionery products are highlighted;

FIG. 3 is an enlargement of FIG. 2, highlighting a horizontal row and a vertical row of hexagons and the pentagons that are formed inside the respective hexagons;

FIG. 4 is a further enlargement of a hexagon;

FIG. 5 is an axonometric view showing the sheet of material that exits from two counter-rotating rollers;

FIG. 6 is a strong enlargement of the zone of contact between the two rollers, showing the conformation of the pentagons;

FIGS. 7 and 8 are, respectively, a plan view and a side profile view of a single confectionery product obtained with the apparatus according to the invention;

FIG. 9 is a plan view of the dead zone at the intersection of the vertices of four pentagons where the gum is not cut.

DESCRIPTION OF A PREFERRED EMBODIMENT

The research activity developed by the Applicant has allowed the production of mono-pieces of edible products, in particular chewing gum, having the shape of irregular pentagons with rounded corners, as shown in the plan and section views of FIGS. 7 and 8, where they are denoted by reference numeral 1.

The production process to obtain the sugar-coated sweets 1 consists of passing a mixture containing gum base after extrusion through several pairs of opposing and counter-rotating rollers in order to reduce the thickness thereof to the desired height for final passage through a pair of forming rollers that impart the desired shape to the individual pieces.

FIG. 5 shows the pair of superimposed forming rollers 11, 12 of the apparatus 10 according to the invention, from which a sheet of material 13 exits bearing the individual products 1, which will subsequently be separated one from the other following cooling of the mass of material.

FIGS. 1 to 3 show one of the two identical rolls 11, 12, which have a specific pattern with engravings of particular shapes, which can be seen more clearly in FIG. 3.

More particularly, the pattern is obtained from the superimposition of two series of irregular hexagons 20, all identical one to the other, oriented, respectively, horizontally and vertically, i.e. axially and circumferentially with respect to the roller 11, 12.

Hereinafter, the terms horizontal and vertical and their derivatives will refer to the axial and circumferential orientation respectively with respect to roller 11 or 12.

FIG. 3 shows a row of series 30 of horizontal hexagons and a row of series 40 of vertical hexagons.

Each hexagon 20 has two opposite sides 21 of shorter length with respect to the other four sides 22, which are equal.

The series 30 of horizontal hexagons has the shorter sides 21 placed vertically, while the series 40 of vertical hexagons has the shorter sides placed horizontally.

The result that is obtained from the intersection of the two series of hexagons is a plurality of irregular pentagons 50, 50', all identical to each other in pairs. In practice, inside each irregular hexagon 21, four irregular pentagons identical to each other are formed in opposing pairs.

At the midpoint of each of the respective longer sides 22 of each hexagon, where the vertices of four pentagons 50, 50' meet, there is a small dead zone 25 where the gum is not cut. This dead zone 25, of minimal dimensions, is necessary for structural reasons, in order to facilitate the detaching of the individual pieces without creating waste material. Referring to FIG. 9, this zone, similar in shape to a quadrilateral whose sides (b) are curved with concavity towards the inside of the dead zone, is characterised by a diagonal (a) between 15 mm and 1 mm, preferably between 3 and 10 mm.

At the vertices corresponding to the ends of the sides 21, where the vertices of three pentagons 50, 50' meet, dead zones instead are not determined.

This pattern drawn by the knives of each roller 11, 12 determines, when the sheet of chewing gum 13 is passed between the rollers themselves, the creation of mono-pieces 1 in the shape of an irregular pentagon, as shown in FIGS. 7 and 8.

In FIG. 2, the longitudinal lines of greater thickness 26, 27 indicate higher knives for trimming the side edges of the sheets 13 along the profile of the pentagons 50, 50' producing the minimum material waste.

Also in FIG. 2, the transverse line of greater thickness 28, which follows the profile of the pentagons, along which taller knives are again provided, is used to separate sheets 13, with no material waste.

From what is disclosed, the advantages of the apparatus according to the invention, which makes it possible to obtain individual pieces of chewing gum in the shape of an irregular pentagon with rounded corners and sides of a substantially elliptical shape (FIG. 9) or semi-elliptical if the contrasting element (12) has a flat surface, with minimum material waste, are evident.

According to a variant embodiment, a single forming roller 11 with a pattern as described above may be used, co-operating with a contrasting element 12 which can still be a roller with a smooth or rough surface, however without the particular pattern.

Alternatively, the contrasting element 12 can be a flat, preferably movable, conveyor belt type surface which accompanies the sheet of material during its forward movement on the forming roller 11.

Naturally the invention is not limited to the particular embodiment described above and illustrated in the accompanying drawings, but numerous detailed changes can be made thereto within the reach of the person skilled in the art without thereby departing from the scope of the invention as defined by the claims appended hereto.

The invention claimed is:

1. Apparatus for the production of chewing gum, comprising, download of an extruder, several pairs of opposing and counter-rotating rollers designed to reduce a thickness of a sheet of gum base (13) for passage between a pair of engraved, counter-rotating forming rollers (11, 12) to form on said sheet of gum base (13) individual pieces (1) of chewing gum to be separated one from the other, wherein said forming rollers (11, 12) have a first series (30) of hexagons (20) oriented horizontally, axially with respect to said forming rollers (11, 12), and a second series (40) of said hexagons (20) oriented vertically, circumferentially with respect to said forming rollers (11, 12), said hexagons (20) being all identical one to the other and perimetrically delimited by knives, an intersection of reciprocally orthogonal series (30, 40) of said hexagons (20) determining in each of said hexagons (20) four pentagons (50, 50') identical one to the other in opposing pairs, a pattern drawn by said knives determining on said sheet of gum base (13) a creation of said individual pieces (1) of said chewing gum in a shape of a pentagon,
wherein each of said hexagons (20) has two opposing sides (21) of shorter length with respect to other four sides (22), which are identical one to the other, wherein at a midpoint of each of said respective longer sides (22) of each of said hexagons (20), where vertices of four of said pentagons (50, 50') meet. there is a small dead zone (25), wherein said sheet of gum base (13) is not cut.

2. Apparatus according to claim 1, wherein said first series (30) of said horizontal hexagons (20) has shorter sides (21) placed vertically, while said second eries (40) of said vertical hexagons (20) has the shorter sides (21) placed horizontally.

3. Apparatus according to claim 2, wherein said small dead zone (25) has a quadrilateral form whose sides are curved with concavity towards an interior of said small dead zone (25), in order to facilitate detaching of said individual pieces (1) of said chewing gum.

4. Apparatus according to claim 1, wherein along longitudinal or circumferential lines (26, 27), at edges of said forming rollers (11, 12), higher knives are provided for trimming side edges of said sheets of gum base (13) along a profile of said pentagons (50, 50') producing a minimum material waste.

5. Apparatus according to claim 1, wherein on said forming rollers (11, 12) there is provided a transverse line (28), which follows a profile of said pentagons (50, 50'), along which higher knives are provided to separate said sheet of gum base (13), without material waste.

6. Apparatus according to claim 1, wherein said dead zone (25) has a diagonal (a) with a length between 1 millimeter and 15 millimeters.

7. Apparatus according to claim 1, wherein said dead zone (25) has a diagonal (a) with a length between 3 millimeters and 10 millimeters.

8. Apparatus for the production of chewing gum, comprising, download of an extruder, several pairs of opposing and counter-rotating rollers designed to reduce a thickness of a sheet of gum base (13) for passage between a pair of engraved, counter-rotating forming rollers (11, 12) to form on said sheet of gum base (13) individual pieces (1) of chewing gum to be separated one from the other, wherein said forming rollers (11, 12) have a first series (30) of hexagons (20) oriented horizontally, axially with respect to said forming rollers (11, 12), and a second series (40) of said hexagons (20) oriented vertically, circumferentially with respect to said forming rollers (11, 12), said hexagons (20) being all identical one to the other and perimetrically delimited by knives, an intersection of reciprocally orthogonal series (30, 40) of said hexagons (20) determining in each of said hexagons four pentagons (50, 50') identical one to the other in opposing pairs, a pattern drawn by said knives determining on said sheet of gum base (13) a creation of said individual pieces (1) of said chewing gum in a shape of a pentagon, wherein on said forming rollers (11, 12) there is provided a transverse line (28), which follows a profile of said pentagons (50, 50'), along which higher knives are provided to separate said sheets of gum base (13), without material waste.

9. Apparatus according to claim 8, wherein along longitudinal or circumferential lines (26, 27), at edges of said forming rollers (11, 12), higher knives are provided for trimming side edges of said sheets of gum base (13) along a profile of said pentagons (50, 50') producing a minimum material waste.

\* \* \* \* \*